Patented Aug. 6, 1929.

1,723,155

UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

SOLUTION FOR ELECTROLYTIC CELLS.

No Drawing.   Application filed November 14, 1925. Serial No. 69,161.

My invention relates to a solution for electrolytic cells and more particularly to an electrolyte to be used in rectifiers, condensers, lightning arresters, and the like.

One object of my invention is to provide a method for preventing the deterioration of an electrolyte containing an organic substance, and for preventing the formation of deleterious fungous growth therein.

Another object of the invention is to provide a novel electrolyte which contains an organic substance as one component but in which the tendency to form mold either during use or during storage will be minimized.

Electrolytes to be used in rectifiers, condensers, lightning arresters, and the like, often contain as one component an organic substance; this may be mild organic acid or similar compounds. The efficiency of electrolytes of this type is often materially lowered due to the formation therein of a fungous growth. I have discovered that when one of a certain class of substances is present in the solution practically no fungous growth will take place. Furthermore, the presence of this preventative will not reduce the efficiency of the solution nor will it hinder the successful operation of the cell.

I have found that if a substance which contains a benzoate radical is added to the electrolyte that the formation of the fungous growth or mold is reduced to a minimum. The benzoate radical may be introduced in a variety of forms without changing the effect either on the efficiency of the cell or on the preventative action of the benzoate radicals.

I may add benzoic acid or an inorganic salt of this acid to the electrolyte of the cell. Since sodium and potassium benzoate are more soluble than the free acid or the benzoate salts of the heavier metals, the addition of these compounds is especially applicable to my invention. The percentage may vary widely as a large excess of the preventative substance over that required does not interfere with the proper action of the electrolyte. I have found that if the preventative is present in percentages as low as .1 or .2% that the action will be satisfactory and that harmful fungous growth will be prevented. At times, I have used percentages of 1 or 2% or even more and while such percentages may not dissolve completely, the undissolved material seems to come into use and exert a beneficial effect with the continued operation of the cell.

In my pending application, Serial No. 16,578, filed August 14, 1925, I describe a novel electrolyte particularly desirable for use with cells having aluminum or other film-forming electrodes. The preferred example in this application is as follows: 3 to 10% by weight of mono-basic potassium phosphate, 3 to 10% of di-basic ammonium phosphate, 3 to 15% of malic acid, and 91 to 63% of water. It is to be noted that this electrolyte contains organic material, to wit, malic acid. Other mild acids such as citric acid may be used in place of the malic acid. The presence of a compound containing the benzoate radical in this electrolyte prevents the formation of harmful amounts of the fungous growth which otherwise tends to form.

It may be that upon the addition of a benzoate salt to the electrolyte that the corresponding malate will be formed with the liberation of free benzoic acid in the solution. For example, there is some indication that if sodium benzoate is added the corresponding sodium malate will be formed and benzoic acid will be liberated as a precipitate which floats in the electrolyte. For the purposes of my invention, this is immaterial, for the benzoate radical is the active part and even when this is present largely in solid form, enough goes into solution to bring about the desired effect when the cell warms up with use.

I have given a typical electrolyte in which the presence of the benzoate radical has proved to be satisfactory. I do not wish to have this interpreted in any way as limiting my invention, for my preventative will act to advantage in any electrolytic solution which contains organic substances.

Considerable modification in the percentages and in the ingredients are possible with no departure from the essential features of the invention.

I claim:

1. In an electrolyte for electrolytic rectifiers, condensers and the like containing an organic acid radical, a compound having a benzoate radical.

2. In an electrolyte for electrolytic rectifiers, condensers and the like containing an organic acid radical, an inorganic salt of benzoic acid.

3. In an electrolyte for electrolytic rectifiers, condensers and the like containing an organic acid radical, sodium benzoate.

4. In an electrolyte for electrolytic rectifiers, condensers and the like containing an organic acid, a compound having a benzoate radical.

5. In an electrolyte for electrolytic rectifiers, condensers and the like containing an organic acid, an inorganic salt of benzoic acid.

6. In an electrolyte for electrolytic rectifiers, condensers and the like containing an organic acid, sodium benzoate.

7. An electrolyte for electrolytic rectifiers, condensers, and the like, comprising a phosphate of an alkali metal or radical, an organic acid, and a substance having a benzoate radical.

8. An electrolyte for electrolytic rectifiers, condensers, and the like, comprising a phosphate of an alkali metal, or radical, malic acid, and a substance having a benzoate radical.

9. An electrolyte for rectifiers, condensers, and the like, comprising a phosphate of potassium, a phosphate of ammonium, an organic acid, and a substance having a benzoate radical.

10. An electrolyte for rectifiers, condensers, and the like, comprising a phosphate of potassium, a phosphate of ammonium, malic acid, and a substance having a benzoate radical.

WILLIAM H. GRIMDITCH.